(12) United States Patent
Haley, III

(10) Patent No.: US 6,955,275 B2
(45) Date of Patent: Oct. 18, 2005

(54) WASTEWATER TRICKLE TOWER WITH CURTAIN(S)

(75) Inventor: John W. Haley, III, Providence, RI (US)

(73) Assignee: BioProcess Technologies Ltd., Portsmouth, RI (US)

( * ) Notice: Subject to any disclaimer, the term of this patent is extended or adjusted under 35 U.S.C. 154(b) by 83 days.

(21) Appl. No.: 10/376,203

(22) Filed: Feb. 27, 2003

(65) Prior Publication Data

US 2004/0020849 A1 Feb. 5, 2004

Related U.S. Application Data

(60) Provisional application No. 60/360,376, filed on Feb. 28, 2002.

(51) Int. Cl.[7] .................................................. C02F 3/04
(52) U.S. Cl. ........................................ 220/150; 210/615
(58) Field of Search ............................. 210/150, 151, 210/615, 617

(56) References Cited

U.S. PATENT DOCUMENTS

| | | | | |
|---|---|---|---|---|
| 681,884 A | * | 9/1901 | Monjeau ..................... 210/617 |
| 877,569 A | * | 1/1908 | Joseph ........................ 210/150 |
| 3,231,490 A | * | 1/1966 | Fry ............................. 210/615 |
| 3,238,124 A | * | 3/1966 | Burton ........................ 210/615 |
| 3,876,542 A | * | 4/1975 | Carlson ....................... 210/150 |
| 4,411,780 A | * | 10/1983 | Suzuki et al. ................ 210/150 |
| 4,422,930 A | * | 12/1983 | Hatanaka .................... 210/150 |
| 4,451,362 A | * | 5/1984 | Spelsberg .................... 210/150 |
| 5,549,828 A | * | 8/1996 | Ehrlich ........................ 210/617 |
| 5,585,266 A | * | 12/1996 | Plitt et al. ................... 210/150 |
| 5,958,239 A | * | 9/1999 | Sing ............................ 210/150 |
| 6,241,889 B1 | * | 6/2001 | Haley, III .................... 210/615 |
| 6,406,630 B1 | * | 6/2002 | Henry ......................... 210/150 |

* cited by examiner

*Primary Examiner*—Christopher Upton
(74) *Attorney, Agent, or Firm*—Wildman, Harrold, Allen & Dixon LLP

(57) ABSTRACT

A wastewater trickle tower has a support structure containing biomedia and a wastewater discharge arrangement for discharging wastewater onto the biomedia. A receptacle below the biomedia receives wastewater falling from the biomedia. The biomedia is surrounded by a flexible curtain suspended from the support structure and extending down to the receptacle. The curtain may have a vertically-extending, releasably-closable opening.

17 Claims, 11 Drawing Sheets

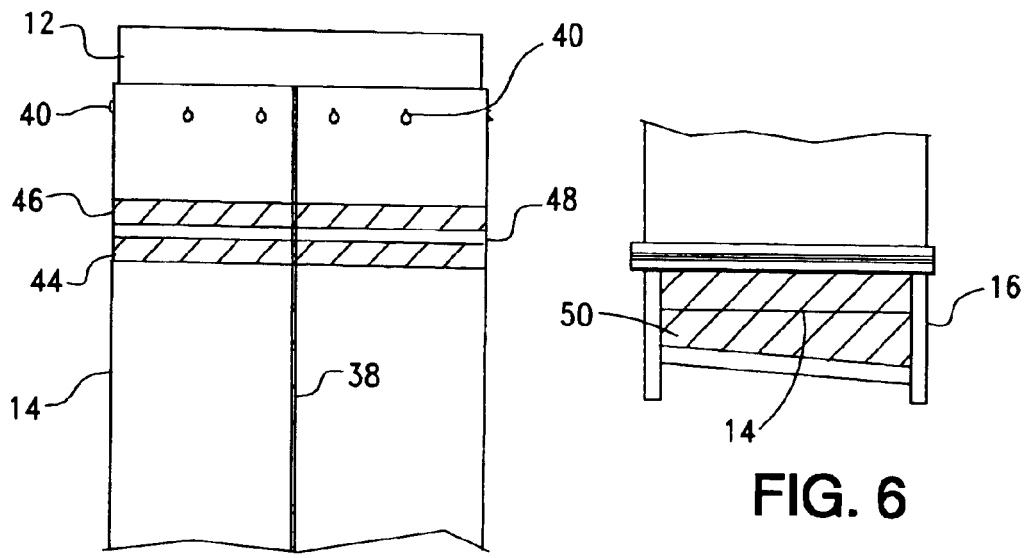
FIG. 5
FIG. 6
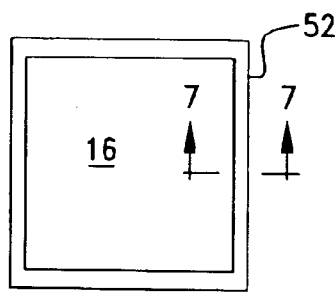
FIG. 8
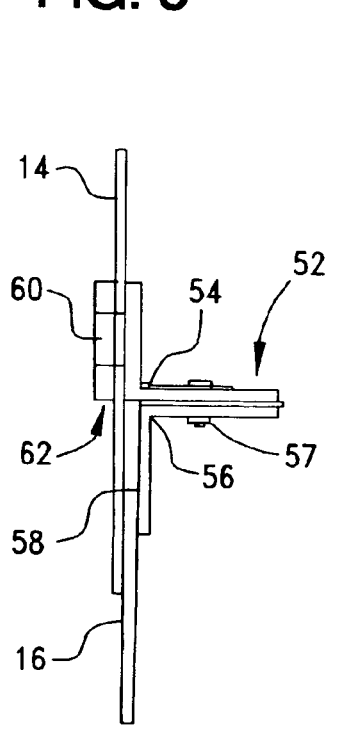
FIG. 7
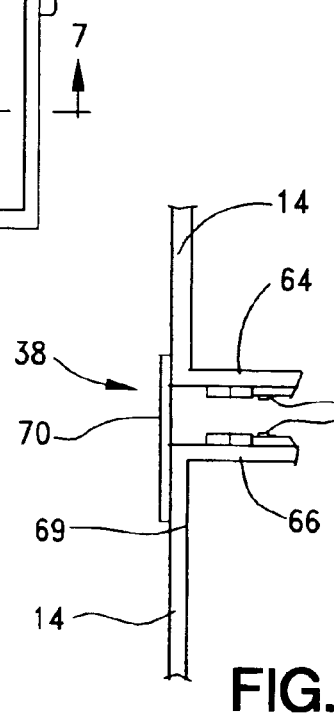
FIG. 9

WASTEWATER TRICKLE TOWER WITH CURTAIN(S)

CROSS-REFERENCE TO RELATED APPLICATION

This application claims the priority of U.S. Provisional Application Ser. No. 60/360,376 filed Feb. 28, 2002.

FIELD OF THE INVENTION

This invention relates to the treatment of wastewater with biomedia, and more particularly to the arrangement of biomedia in an apparatus for treating wastewater.

BACKGROUND OF THE INVENTION

With greater demands being placed on the treatment of wastewater by regulatory authorities, there has become a growing need for systems that will treat wastewater to a higher level of purity. This has also brought an increasing need for systems that are more versatile in design and can more readily be adapted to handle differing wastewater treatment requirements.

I have found that a trickle tower system employing strands of looped cord biomedia is more suited to handling today's increasing demands in wastewater treatment than the conventional systems currently in use. The initial approach of a looped cord biomedia trickle tower system is disclosed in my U.S. Pat. No. 6,241,889 published Jun. 5, 2001. While this tower system has been promising, and the general approach employed appears correct, further improvements and modifications are now desirable for more widespread adoption by industry and civil authorities.

SUMMARY OF THE INVENTION

This invention is concerned with improving and modifying the wastewater treatment process and apparatus disclosed in the above U.S. Pat. No. 6,241,889 the whole disclosure of which is hereby incorporated herein by reference.

This invention is also concerned with developing further approaches to trickle tower treating of wastewater. Some of these approaches are particularly advantageous with looped cord biomedia, and others are advantageous with other biomedia and other systems in addition to being applicable with looped cord biomedia.

This invention is particularly concerned with improving the ease, flexibility, and cost of constructing wastewater trickle towers. In this respect, it is particularly concerned with providing more flexibility with the cross-sectional shape and general construction of the trickle tower. At the same time, the invention is concerned with improving the efficiency and effectiveness of these trickle towers.

According to an aspect of the present invention, there is provided a wastewater treatment apparatus having a support structure with biomedia supported by said support structure. The biomedia preferably comprises a plurality of strands extending downwardly and which may be strips of plastic material, fabric, etc., but are preferably strands of looped cord biomedia. A wastewater discharge arrangement is supported by the support structure for discharging wastewater onto the biomedia. A receptacle is located below the biomedia for receiving wastewater falling from the biomedia. A sleeve forms a wall surrounding the biomedia, the sleeve comprising a flexible curtain suspended from the support structure and extending downwardly to the receptacle.

Such a flexible curtain enables trickle towers of any cross-sectional shape to be readily accommodated, for example, rectangular, polygonal, elliptical, as well as circular cross-sectional shapes.

The curtain may be sealed at an upper end to the support structure and at a lower end to the receptacle. The curtain may have an opening located between the upper end and the lower ends, this opening being closed by a releasable fastener. The releasable fastener may comprise cooperative hook and looped strips, a zipper, or other type of fastener, and facilitates access through the curtain to the biomedia. The curtain may comprise at least two sections releasably connected together by at least two releasable fasteners.

The curtain may have a plurality of holes at its upper end engaged over members extending from the support structure, the holes enabling the curtain to be supported by the support structure while the curtain is being installed around the biomedia.

The support structure may include a hood extending over the wastewater discharge arrangement, and the curtain may be attached to and around this hood.

There may be a series of interconnected treatment cells, each cell having its own biomedia suspended from the support structure over an associated receptacle with the cells being spaced apart. Each cell is preferably individually surrounded by a separate flexible curtain. However, two or more cells may be jointly surrounded by the same flexible curtain.

The support structure is preferably part of a weatherproof building in which the treatment apparatus is housed.

The biomedia strands are preferably arranged under tension and extending spaced apart, vertically and parallel to each other.

When a tower of non-circular cross-section is chosen, the wastewater discharge arrangement preferably comprises a rotatable spray arm which in use defines a circular spray pattern, and a plurality of stationary spray nozzles providing a spray pattern of wastewater outside of this circular spray pattern. The stationary nozzles preferably provide pulsing spray jets.

According to another approach, the wastewater discharge arrangement comprises a manifold extending along and oscillatable about a transverse, preferably horizontal, axis, the manifold having a transversely extending nozzle opening through which a sheet of wastewater is discharged onto the biomedia, this sheet of wastewater passing from one side of the biomedia to an opposite side and then from that opposite side back to said one side as the manifold oscillates.

According to another aspect of the invention, there is provided a wastewater trickle tower apparatus comprising a support structure housing biomedia. A wastewater discharge arrangement is supported by the support structure above the biomedia for discharging wastewater onto the biomedia. A receptacle below the biomedia receives wastewater falling from the biomedia. The biomedia occupies a block-like space. A flexible curtain is suspended from the support structure and extends down to the receptacle, this curtain surrounding the block-like space.

The curtain may have at least one slit having a releasable fastener, the fastener including a sealing strip secured to the curtain on one side of the slit and slideable over the curtain on the opposite side of the slit.

Other objects, features, and advantages of the present invention will become more fully apparent from the following detailed description of the preferred embodiments, the appended claims, and the accompanying drawings.

BRIEF DESCRIPTION OF THE DRAWINGS

In the accompanying drawings, in which like reference characters in the same or different Figures indicate like parts:

FIG. 5 is a partial schematic elevational view in the direction of the arrow 5 in FIG. 4;

FIG. 6 is a partial schematic elevational view of the lower section of a cell of the apparatus of FIG. 1 showing the lower part of the curtain inside a base receptacle;

FIG. 7 is a section on the line 7—7 of FIG. 8 showing details of sealing the curtain to the inside of the base receptacle;

FIG. 8 is a simplified plan view of the base container of FIGS. 6 and 7;

FIG. 9 is a diagrammatic plan view of an openable vertical connection in the curtain of FIGS. 3 and 5;

DETAILED DESCRIPTION OF THE PREFERRED EMBODIMENTS

Figure 1:
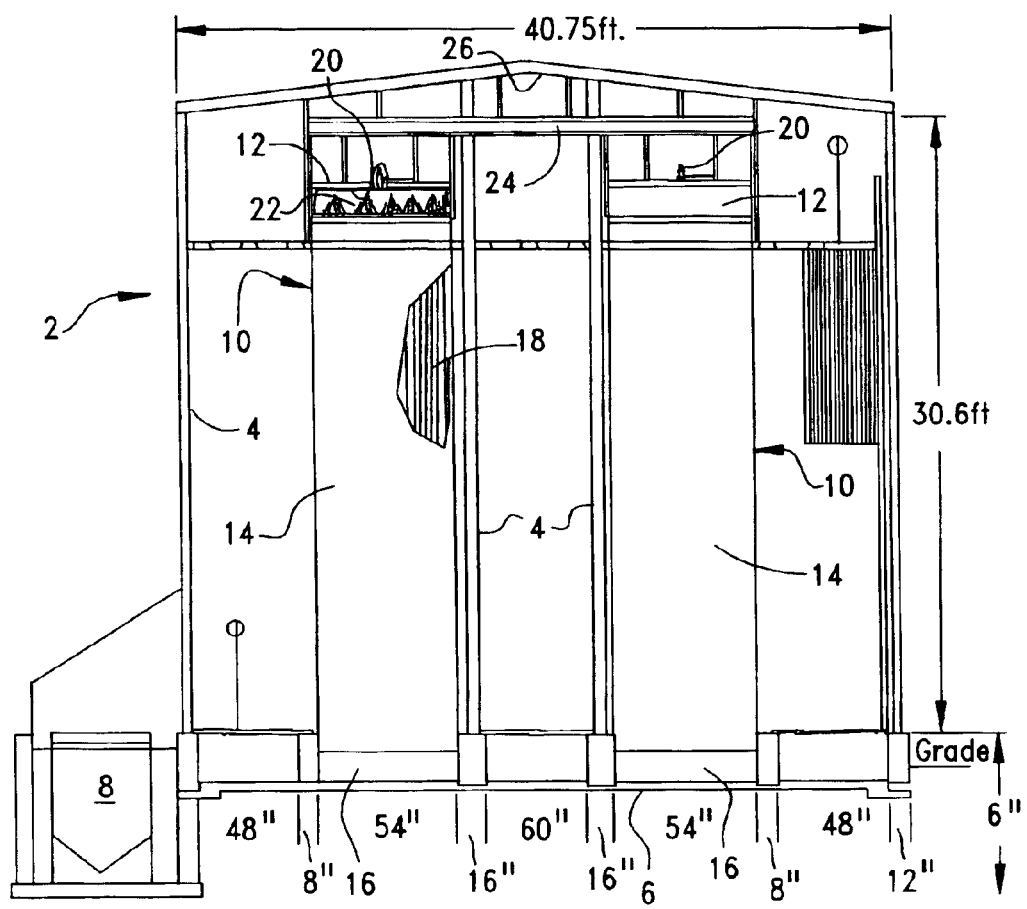
FIG. 1 is a schematic vertical section of a trickle tower wastewater treatment apparatus embodying the present invention.

FIG. 1 shows an exterior, weatherproof, steel building 2 having a support structure 4 erected on a concrete base 6, with a covered recirculation tank 8 outside the building. Two wastewater treatment cells 10 are shown. Each cell 10 has an upper closure hood 12, a flexible curtain 14 draped around the hood 12 and extending downwardly into a base receptacle 16 formed on the concrete base 6. Biomedia 18 is enclosed by the curtain 14, and a wastewater spraying or discharge system 20 is mounted inside the hood 12 above the biomedia, both as shown through broken away portions of the left cell 10. Wastewater 22 from the spraying system 20 flows down the biomedia 18 and drips into the base receptacle 16, illustrated as a base tray from which the partially treated wastewater flows to the recirculation tank 8 for recirculation to the spraying system 20 of the same or another cell. Of course the base tray 16 could be constructed as a recirculation tank, so eliminating the outside recirculation tank 8. The hoods 12 are suspended by structural members 24, 26 supported by and forming part of the building structure 4, for example the roof rafters. The curtains 14 are attached and sealed to the outside of the hoods 12, and to the inside of the base receptacles 16.

Figure 2:
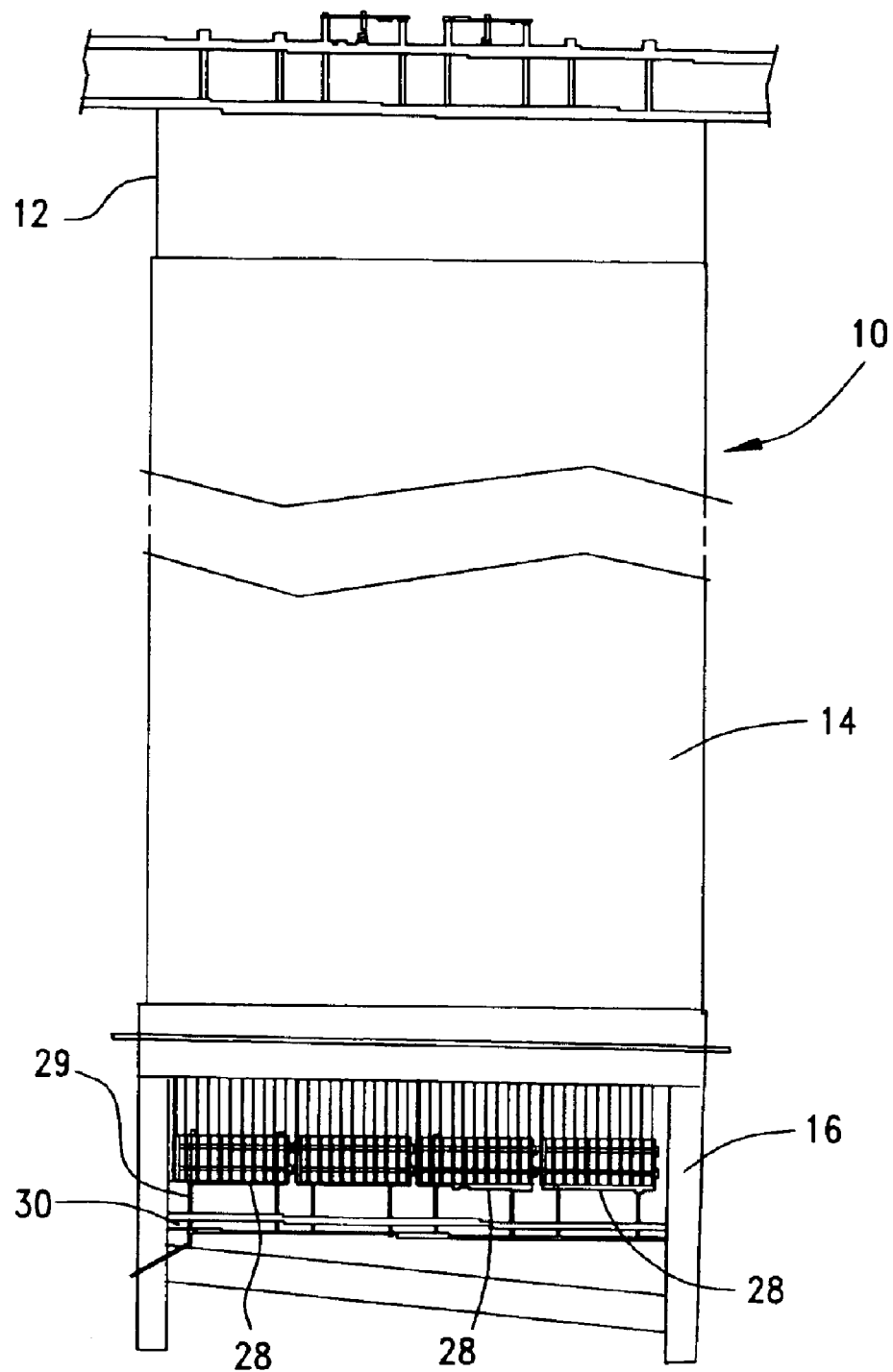
FIG. 2 is an elevational side view, with parts removed for clarity, of a single cell unit of the apparatus of FIG. 1.

FIG. 2 shows one of the cells 10 in side view, the curtain 14 surrounding and defining this cell, extending downwards from the outside of the hood 12 to the inside of the base receptacle 16. Although varies types of biomedia could be used inside the confines of the curtains 14, looped cord biomedia having looped continuous filaments is preferred, and preferably the looped cord biomedia is tensioned vertically. To show such a preferred arrangement, the side of the base receptacle 16 has been omitted to expose lower ends of four grates 28 (described in detail later) attached by adjustable tensioning bolts 29 to an anchor bar 30 extending horizontally across the base receptacle 16. These tensioning bolts 29 are a slip fit through holes in the anchor bar 30, to allow the bolts 29 to slip downwardly through the anchor bar 30, if any grate 28 lengthens and drops down a little in use due to the weight of the biomass forming on the biomedia strands of the grate. This prevents such strands from sagging in use.

Figure 3:
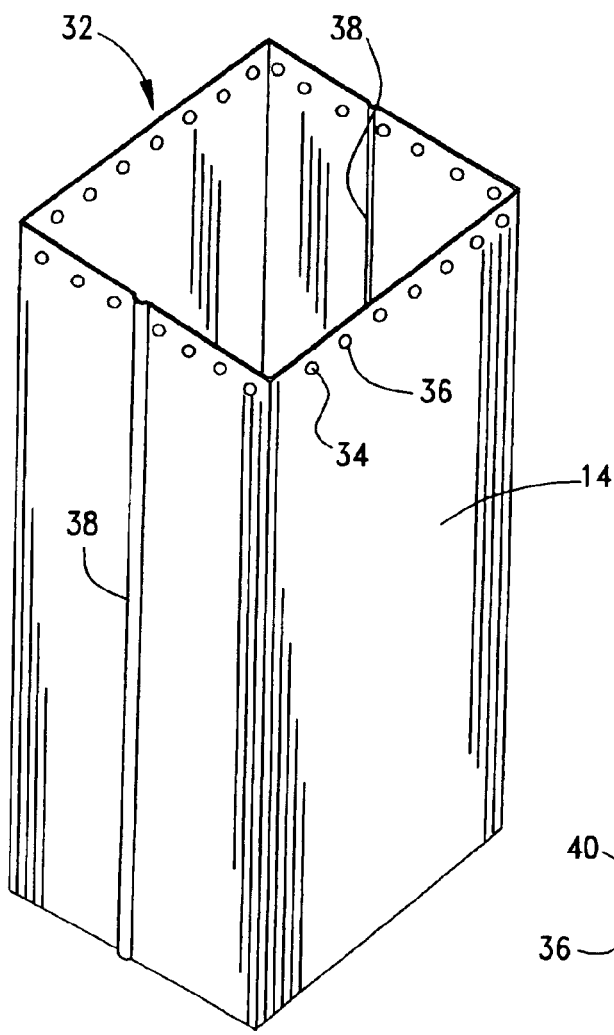
FIG. 3 is a diagrammatic perspective view of a curtain according to the invention that surrounds one or more treatment cells in the apparatus of FIG. 1.

FIG. 3 illustrates in perspective view one of the curtains 14. It forms a tube-like casing, preferably made of flexible plastic sheeting, for example polyvinylchloride, polypropylene, etc. Due to the flexibility and deformability of the sheeting, the tube-like casing can have any required cross-sectional shape. As shown, it has a square cross-section 32; however, the cross-section may be rectangular, elliptical, circular, etc. In this way, the curtain 14 can be adapted to closely surround and define any shaped block of biomedia, whether solid biomedia, suspended strips, or looped cord. Around the top of the curtain is a series of small holes 34 reinforced by metal (preferably stainless steel) grommets 36. These holes are hooked over pegs extending from the hood (shown in FIGS. 4 and 5); this serves as an aid when mounting the curtain 14 around the hood 12, and it also provides physical support for the curtain 14 once mounted. Extending the full vertical length of the curtain 14 is at least one releasable fastener 38 closing an opening or slit in the curtain. Preferably, there are two, three, four or more such releasable fasteners 38, two being shown. These fasteners may comprise a standard type releasable zipper, preferably of plastic material, as used with outer coats such as Parkas, or may comprise any other type of releasable connection suitable around wastewater. Preferably, this fastener comprises inter-engaging looped and hook strips as sold under the trademark VELCRO. One function of the releasable fastener(s) is to facilitate assembly and mounting of the curtain 14 around the biomedia; this enables the biomedia to be assembled in place and then the curtain hung around the biomedia. Another function is to provide ready access to the biomedia, particularly for inspecting the condition of the biomedia in use, and for repairing or replacing the biomedia. Although the releasable fastener 38 preferably runs the full length of the curtain, one or more of these fasteners may extend only for a portion of the length of the curtain 14.

Figure 4:
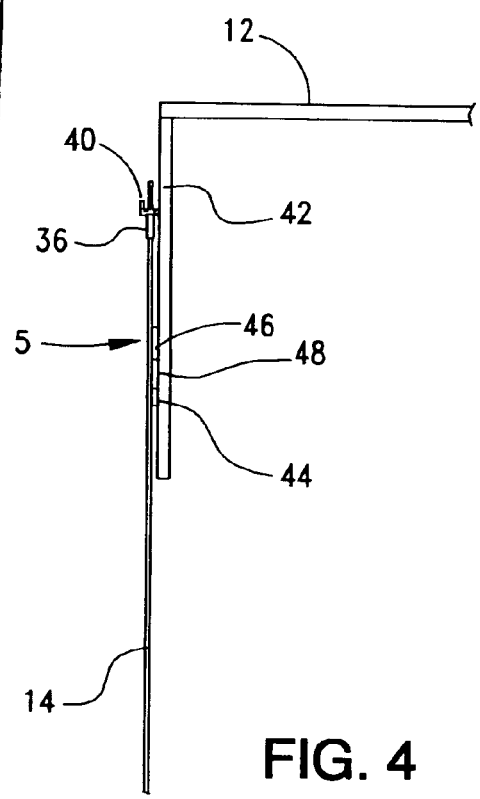
FIG. 4 is a partial vertical section illustrating the connection of the top of the curtain of FIG. 3 to a hood part of the apparatus of FIG. 1.

FIG. 4 shows the attachment of the top of the curtain 14 to the hood 12. One of the grommets 36 at the top curtain edge is engaged over an L-shaped peg or hook 40 mounted on the outside of the hood's downwardly extending sidewall 42. Below the peg 40 are two spaced-apart releasable hook and looped connections 44, 46 (i.e. two pairs of VELCRO connections). These connections extend all the way around the hood 12, and sealingly reinforce attachment of the top of the curtain 14 to the hood. Mounted on the hood between the two releasable connections 44, 46 is a sealing strip 48 of rubber or other gasket material, which also extends all around the hood 12. This sealing strip 48 is resiliently compressible, and presses against the inside of the curtain to ensure both a watertight and an airtight joint between the curtain 14 and the hood 12.

FIG. 5 further illustrates the sealed connection of the upper portion of the curtain 14 to the hood 12. As can be seen, there is a series of L-shape pegs 40 spaced apart around the hood. The vertically spaced-apart VELCRO strip connections 44, 46 can be seen above and below the continuous horizontal sealing strip 48; however, these strip connections and sealing strip are covered and concealed by the curtain 14, but are shown through the curtain in FIG. 5 for the purpose of illustration.

FIG. 6 illustrates the base receptacle 16 with a transparent sidewall 50, to show the bottom of the curtain 14 extending down inside the base receptacle.

FIG. 7 is a fragmentary section illustrating the sealing of the bottom of the curtain 14 to the inside of the base receptacle 16. FIG. 8 is a plan view of the top of the base receptacle showing a flange around the outside of the base receptacle 16. FIG. 7 is a section on the line 7—7 of FIG. 8 showing the outside flange 52 formed by two right angle steel bars 54, 56 bolted together at 57. The lower bar 56 is welded to an outside upper lip 58 of the base receptacle 16, and the upper bar 54 is bolted to a flat bar 60 on the inside of the curtain 14, the curtain being sealingly clamped therebetween. In this way, a both water and air tight joint 62 is formed between the bottom of the curtain and the inside of the base receptacle. Adhesive may be used between all mating surfaces and, in addition, a gasket may be sandwiched between the two right angle bars 54, 56 to further ensure the tightness of joint.

FIG. 9 illustrates in plan view an arrangement to make each releasable vertical connection 38 watertight and substantially air tight. At each connection 38, the adjacent edges of the curtain 14 have right angle flanges 64, 66. The facing sides of these flanges 64, 66 each carry a complementary strip 68 of VELCRO or the like, these flanges and strips extending the full vertical length of each curtain edge. On the inside of one curtain edge is welded at 69 a vertical sealing strip 70 of plastic material, e.g. PVC, this strip overlapping the other vertical curtain edge in a sliding and sealing relationship. When the two right angle flanges 64, 66 are physically brought together, the complimentary VELCRO strips 68 sealingly and securely engage, and the flap formed by the internal sealing strip 70 slides over and against the inner surface of the adjacent curtain portion 14 to seal the vertical releasable connection 38.

To assemble the curtain 14 around the biomedia 18, the curtain is first supported by placing the grommets 36 over the hooks 40, next the pair of VELCRO strips 46 are pushed together, then the pair of VELCRO strips 44 are connected so squeezing the gasket 48. The bottom of the curtain is next connected and sealed to the base receptacle 16. Finally, the releasable connection 38 is "zippered up" by pressing its VELCRO strips 68 together.

Figure 10:
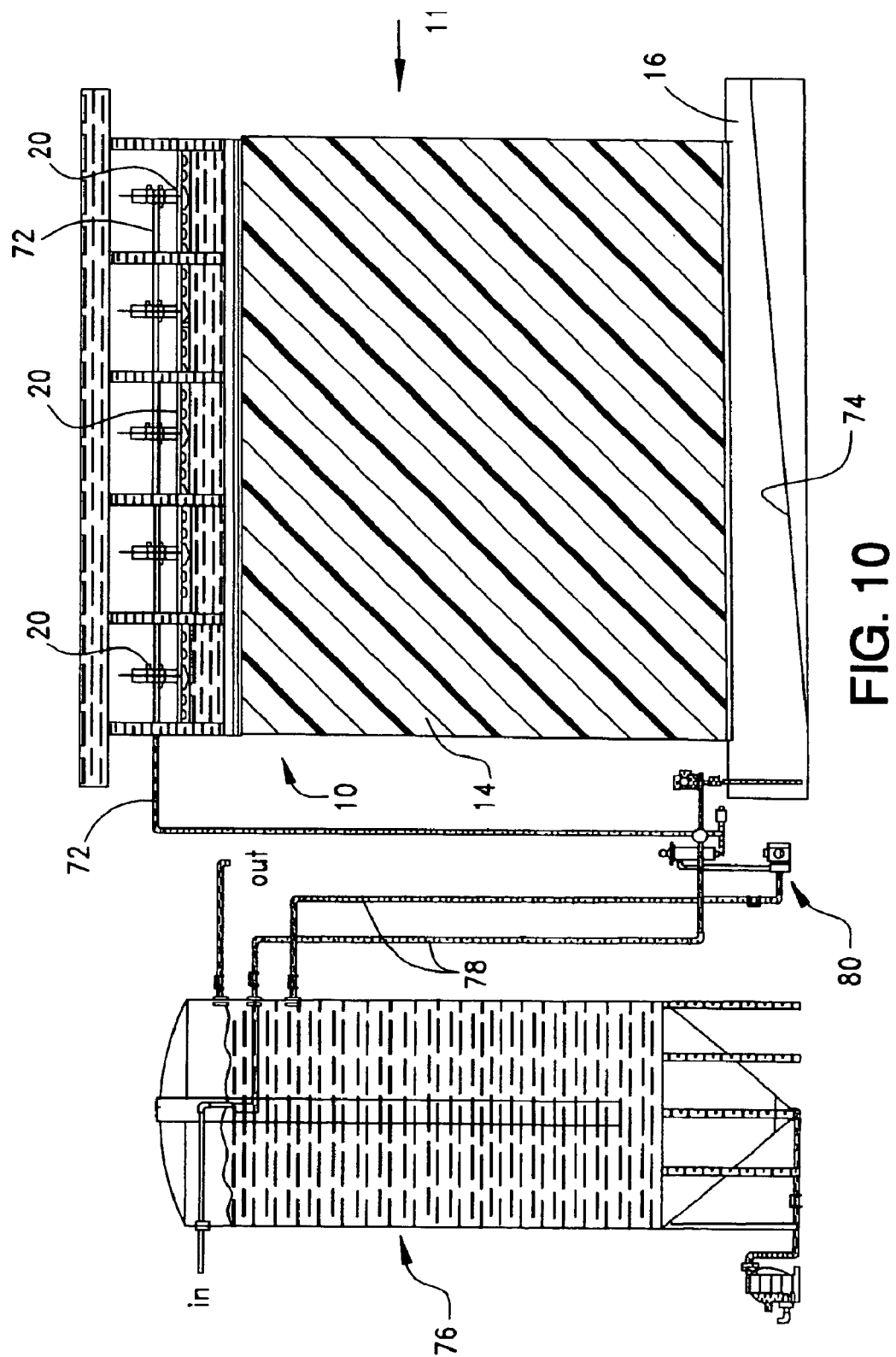
FIG. 10 is a schematic elevational view, partly in section, of another version of the apparatus of FIG. 1.

FIG. 10 illustrates in side view a variant of the apparatus of FIG. 1 and shows an elongate treatment cell 10 surrounded by a curtain 14. At the top of this cell 10 are five wastewater spray units 20 fed by a common supply pipe 72. An elongate base receptacle 16, with a downwardly inclined floor 74, communicates with an external free-standing recirculation tank 76 and the spraying system 20 via pipes 78 and a pump system 80, which effects recirculation of the wastewater through the cell 10.

Figure 11:
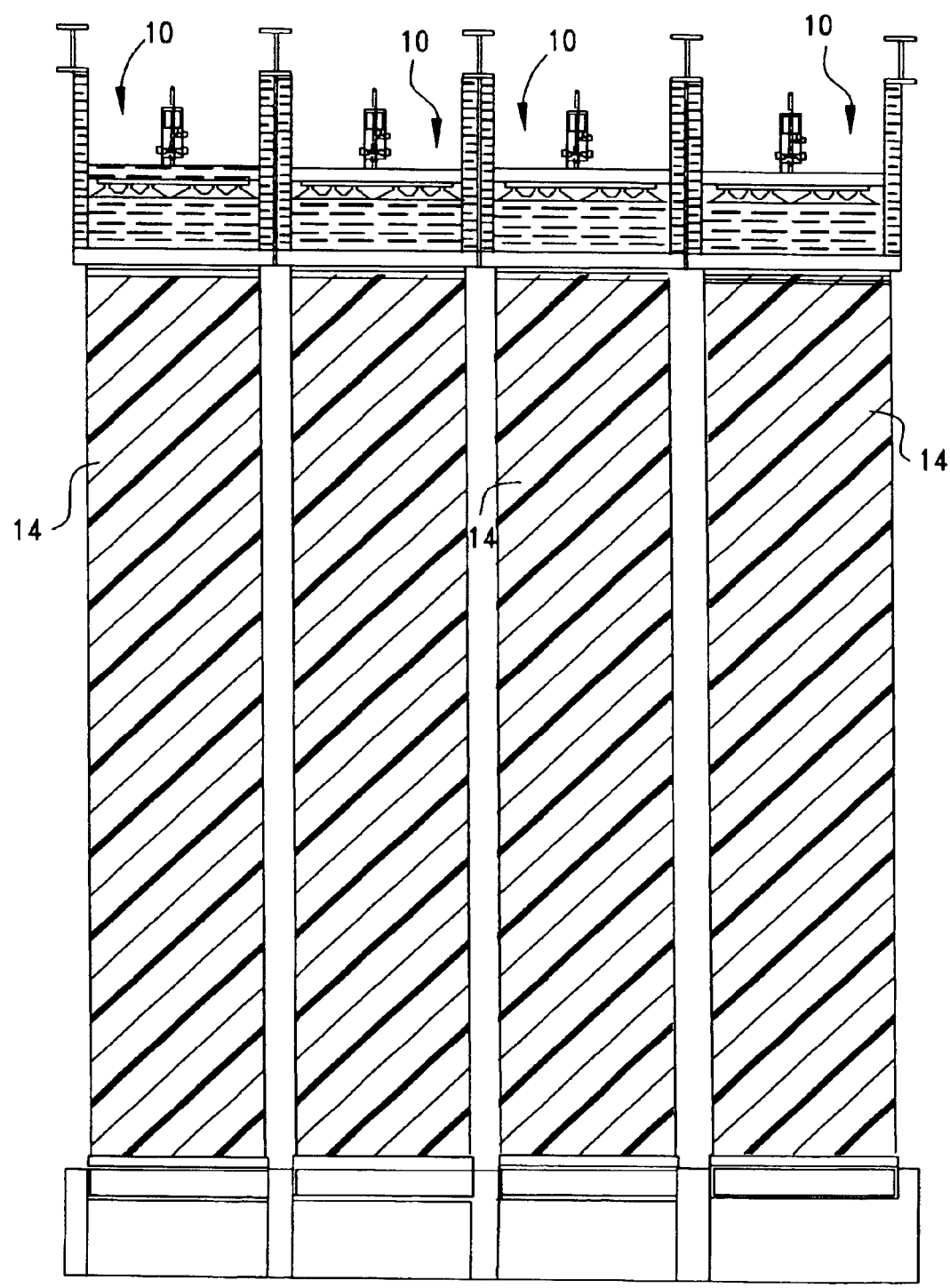
FIG. 11 is a schematic elevational view in the direction of the arrow 111 in FIG. 10.

FIG. 11 is an end view of the apparatus of FIG. 10, and shows four similar treatment cells 10 side by side. Each of these cells 10, and the biomedia therein, is surrounded and contained by a separate curtain 14. By viewing FIG. 11 in conjunction with FIG. 10, it will be realized that each cell 10 has an elongated rectangular horizontal cross-section.

When the horizontal cross-section of a cell is circular, a rotating spray arm, such as shown and described in previously referenced U.S. Pat. No. 6,241,889, would be satisfactory. However, with non-circular horizontal cross-sections, for instance square, oval, and rectangular cross-sections, a circular spray pattern may leave corner and/or end sections starved of sprayed wastewater. To overcome this, stationary spray nozzles may additionally be placed in the corners, or any other area missed by the circular spray pattern. These stationary nozzles preferably should be given a pulsing action to provide the sprayed biomedia with an opportunity to receive alternately wastewater and air. Alternately, an oscillating spray system could be employed, preferably oscillating about a horizontal axis extending along the longer dimension of the cross-section, to spray the wastewater on the biomedia.

Figure 12:
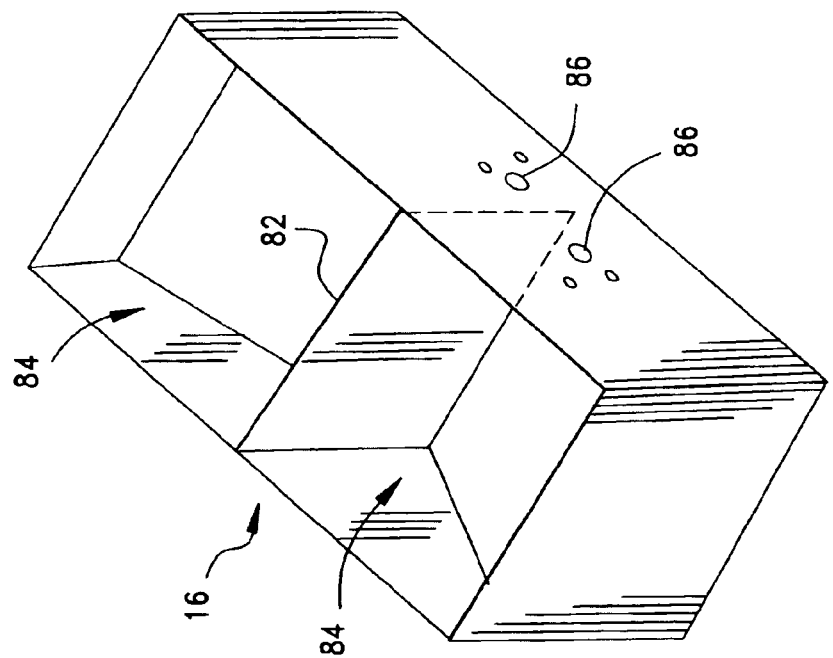
FIG. 12 is a diagrammatic perspective view of a base container partitioned for use with two cells to be surrounded by a common curtain.

FIG. 12 illustrates a base receptacle 16 for use with two treatment cells contained in a common surrounding curtain 14. A partition 82 in the base receptacle 16 divides it into two separate drip trays 84, each with its own set of outlet ports 86. Each cell would be of square cross-section, whereas the single curtain wall would be of elongate rectangular cross-section.

The above illustrates how the flexible curtain can be used to accommodate a variety of different shapes and arrangements. It does so in a way that is easy and inexpensive to install, relatively inexpensive to manufacture, may facilitate inspection of and access to the biomedia, and offers flexibility for different installation configurations. Further, these curtains are virtually maintenance free.

Figure 13:
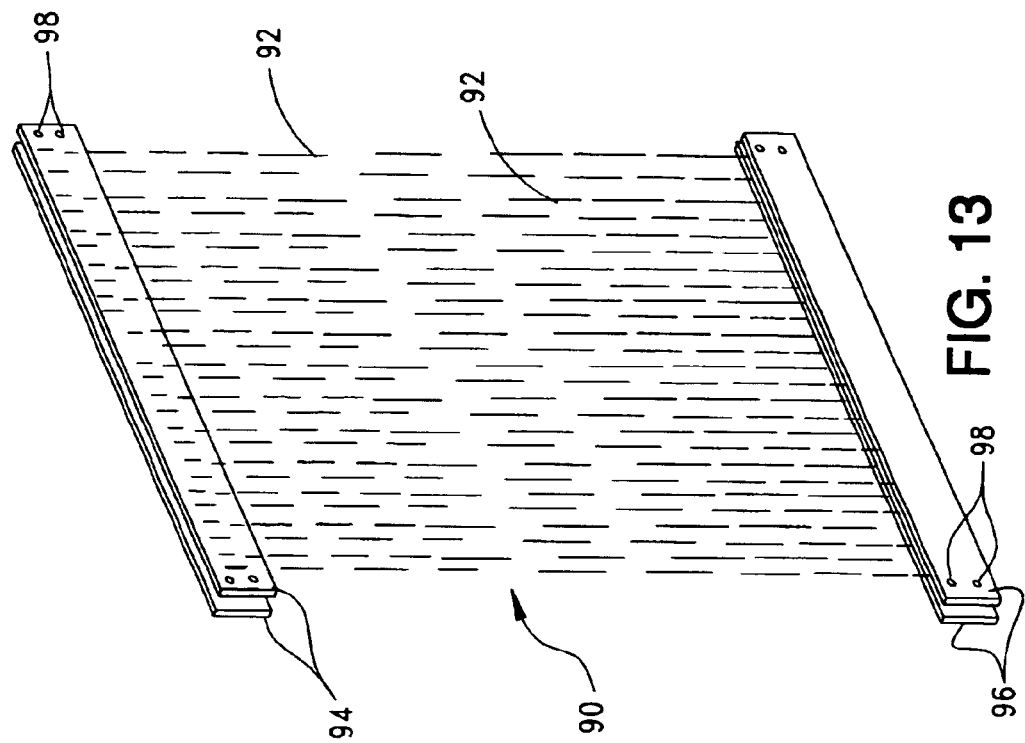
FIG. 13 is a diagrammatic perspective view of a biomedia hanger unit used according to the invention in the apparatuses of FIG. 1 and FIG. 10.

FIG. 13 illustrates a frame or hanger 90 of looped cord biomedia. The hanger 90 has a plurality of discrete lengths 92 of looped cord biomedia extending between upper and lower pairs 94, 96 of hanger bars. The ends of the looped cord 92 are clamped between the respective pairs of bars. The pairs of bars are secured together by gluing, although this could be done by spot welding, the bars preferably being made of plastic material, for example ABS. Each end of each pair of bars has a pair of vertically spaced apart holes 98 for assembling a plurality of hangers together. When the pairs 94, 96 of bars are stretched apart, the lengths 92 of looped cord are spaced apart parallel to each other. The ends of the lengths of looped cord may be cut off flush with the adjacent pair of clamping bars, or may extend just beyond the bars. In the latter case, these extending ends may be heat-treated to cause them to fuse and form enlarged ends to more securely retain the ends from pulling through between the pair of clamping bars.

These hangers are preferably manufactured as a series of links connected together and rolled up into a somewhat cylindrical roll. This is done by forming a warp of strands of looped cord biomedia and clamping a pair of hanger bars across this warp. The warp is then advanced the desired length for the hanger, and another pair of hanger bars clamped across the warp. Thereafter, the warp is advanced a short distance (e.g. 1 to 4 inches) and another pair of hanger bars clamped across the warp. This process continues with the hangers being reeled onto a spool as further hangers are formed. Individual hangers can be then cut from the spool as required. If the cutting is performed by a hot-air knife, the cut ends of the looped cord biomedia fuse as mentioned above.

The looped cord biomedia is preferably made from knitted polyester or PVDC yarns. If the knitted structure enables the loops to be orientated in one axial direction, then in the grate, all such loops should be orientated in the same direction. This is enabled by having discrete cut lengths of biomedia formed from a warp. When assembled in a trickle tower, preferably all these loops would be orientated upwards.

Figure 14:
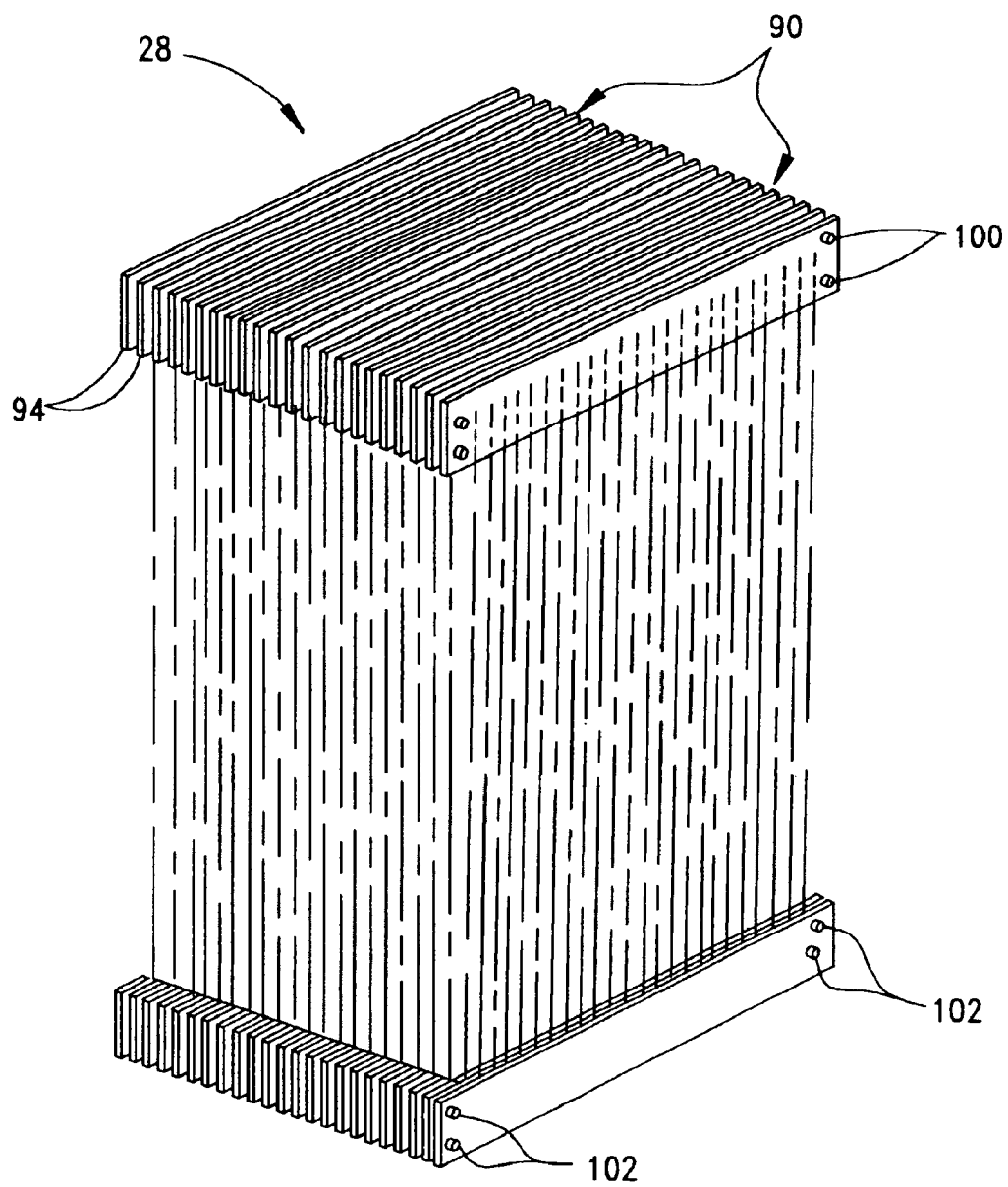
FIG. 14 is a diagrammatic simplified perspective view of a biomedia grate, according to the invention, made up of a plurality of the units of FIG. 13

FIG. 14 shows a plurality of hangers 90 connected together to form a grate 28. The upper pairs of hanger clamping bars 94 are rigidly bolted together by a pair of bolts 100 at each end through the holes previously mentioned. The lower pairs of hanger clamping bars 96 are similarly rigidly bolted together by bolts 102. Spacers keep the pairs of bars correctly spaced apart.

Figure 15:
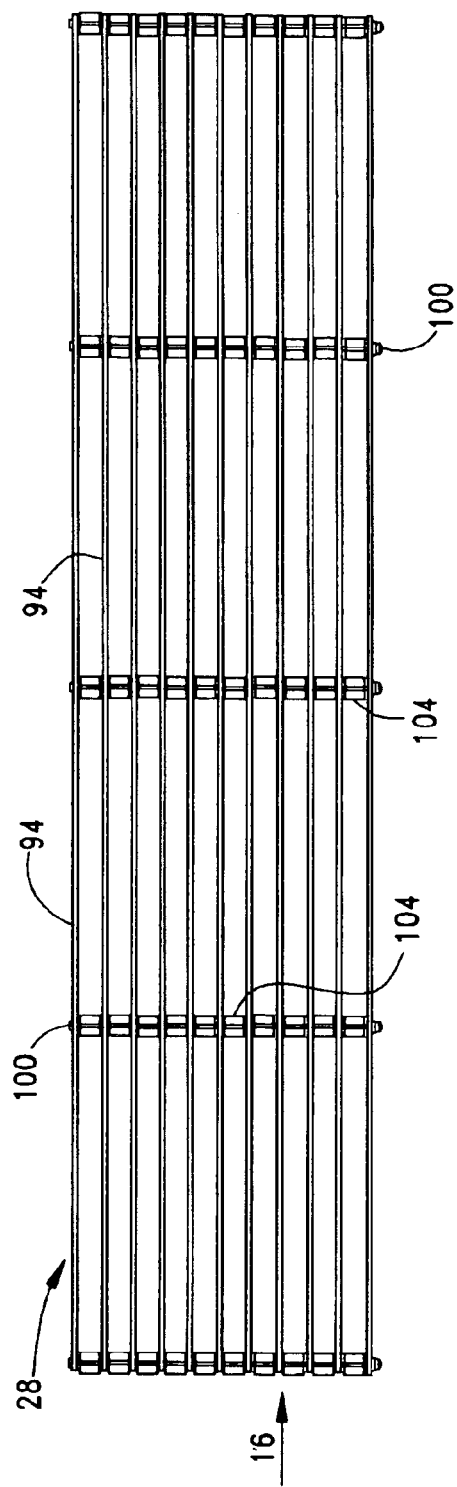
FIG. 15 is a plan view of the grate of FIG. 14.

FIG. 15 shows in plan view the top of the grate 28, although the pairs 94 of hanger bars are relatively longer than in FIG. 14. Eleven pairs of hanger bars are equally space apart by spacers 104 cut from square aluminum tubing. With this longer grate 28, five pairs 100 of equally spaced-apart bolts pass through the bars and the spacers. In this way, the upper pairs 94 of bars are rigidly secured together; the lower pairs of bars of this grate are similarly rigidly secured together.

Figure 16:
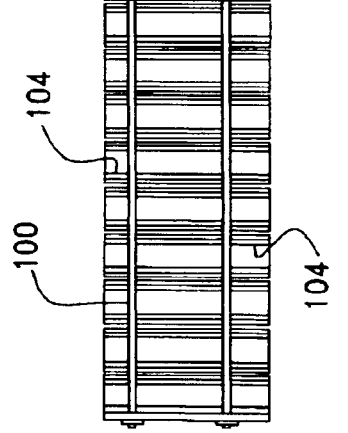
FIG. 16 is an end view of the upper structure of the grate in the direction of the arrow 16 in FIG. 15.
Figure 17:
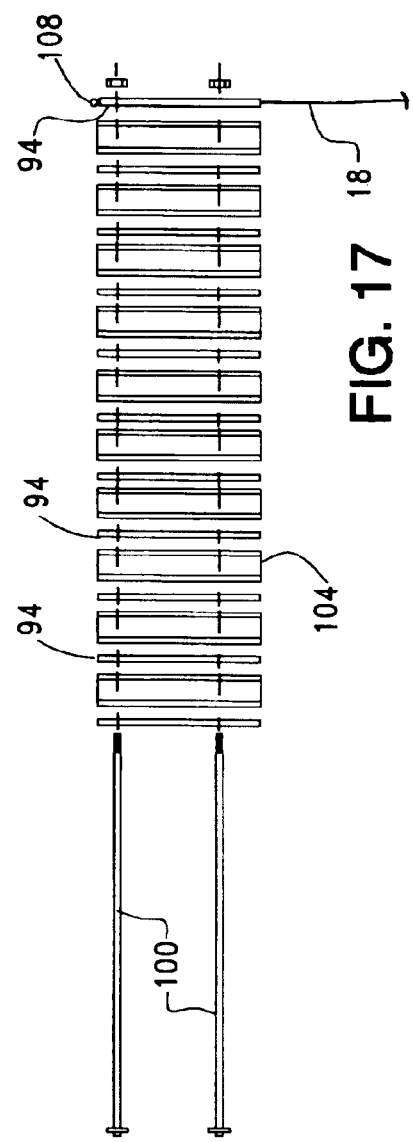
FIG. 17 is an exploded view of FIG. 16 additionally showing a portion of a strand of biomedia.

FIG. 16 is an end view of the upper hanger bars of the grate in the direction of the arrow 16 in FIG. 15 (the lower hanger bars would look the same). The connecting and securing bolts 100 are tightened by their nuts 106 at the right end in FIG. 16. The hollow spacer tubes 104 extend vertically between the pairs of clamping bars for the full height thereof. FIG. 17 is an exploded view of FIG. 16, but also showing a strand 18 of looped cord biomedia clamped between the right outermost pair of clamping bars and extending downwardly therefrom; the upper cut end 108 of the strand 18 can be seen extending slightly above the hanger bars. Although the strands of biomedia are clamped between the pairs of clamping bars before these are assembled into a grate, the subsequent tightening of the grate bolts 100 further aids the securing of the biomedia ends. This improves the integrity of the grate 28, and helps the biomedia strands to be able to carry heavier weights of biomass during operation when purifying wastewater.

Figure 18:
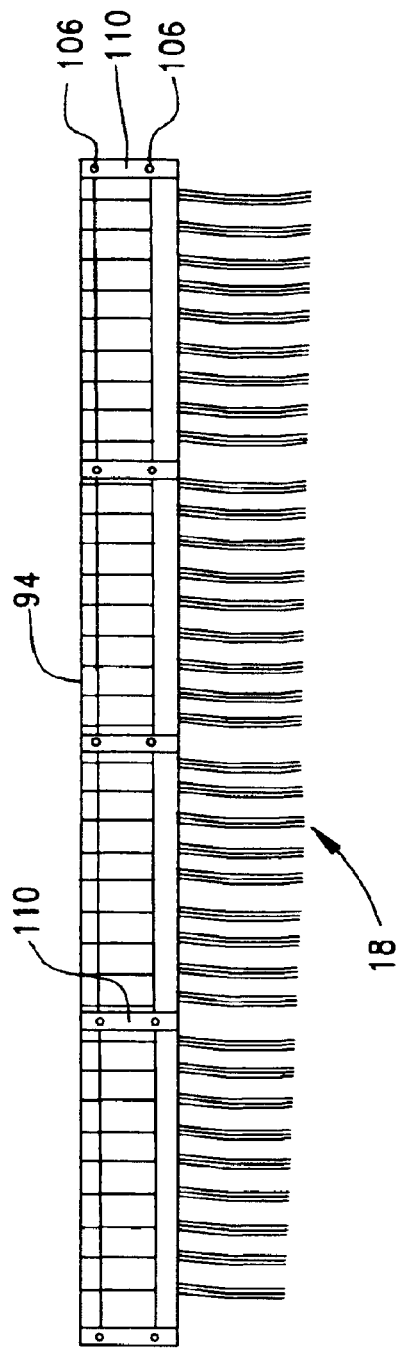
FIG. 18 is a side view of a modification of the grate of FIG. 15 showing the upper portions of the biomedia strands extending downwardly from the upper structure of the grate.

FIG. 18 shows an elevational side view of the grate of FIG. 15 with the beginning of the strands of biomedia 18 extending down from the upper bars 94. A modification is also shown in the form of reinforcing anchor strips 110 between the nuts 106 and the outer plastic hanger bar.

Figure 19:
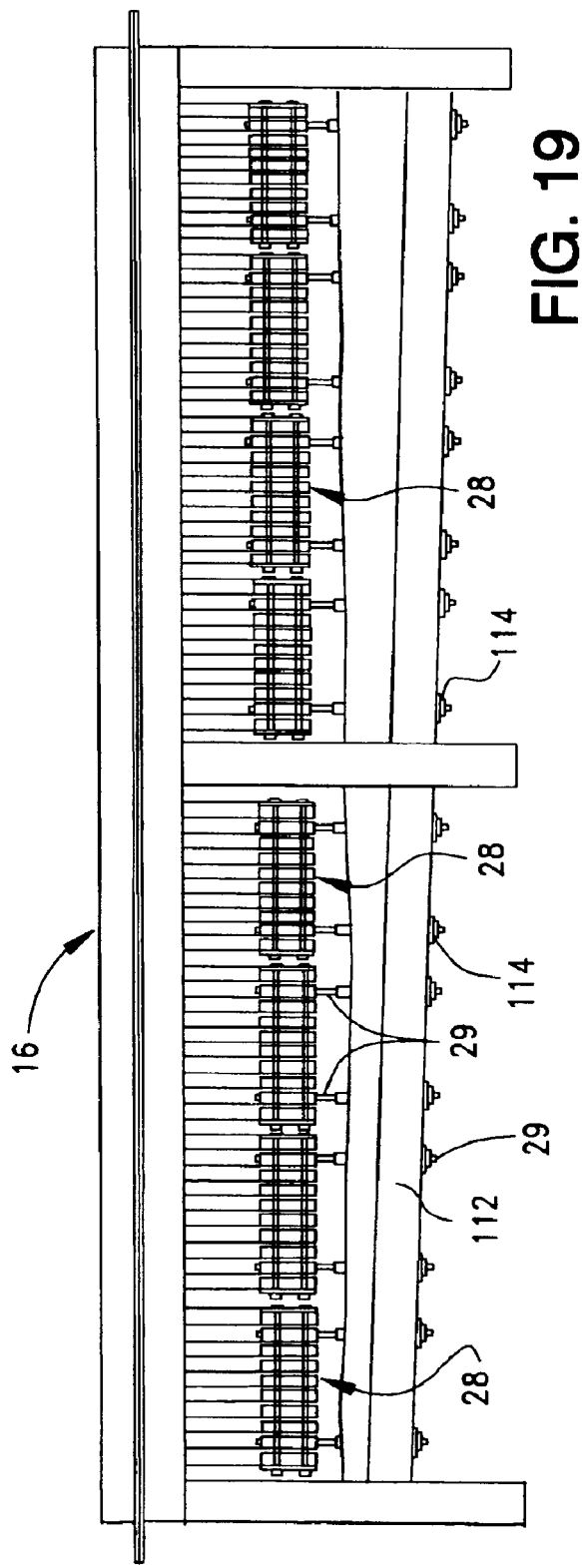
FIG. 19 is a simplified elevational view of a base receptacle for the apparatus of FIG. 1 showing the lower portions of eight grates anchored to the bottom of the receptacle.

FIG. 19 is a view similar to the bottom portion of FIG. 2, but showing the lower anchoring and tensioning bolts 29 for the multiple grates 28 passing through the bottom 112 of the tank 16. Also, this base tank 16 is of double width to function as a common tank for two side-by-side treatment cells, each cell having four grates 28. When the through bolts 29 are tensioned by adjusting their nuts 114 underneath the raised bottom 112 of the tank, the lengths of looped cord biomedia (or any other biomedia strands employed) are tensioned and kept in spaced-apart parallel vertical alignment. The bolts 29 slidingly pass through tubes extending through and sealed to the bottom 112 of the base tank 16. These tubes extend upwardly above the level of the wastewater in the base tank 16 as shown. This enables the lower ends of the grates to move downwardly slightly, should the biomedia stretch under the weight of the biomass forming on it during processing of the wastewater.

Figure 20:
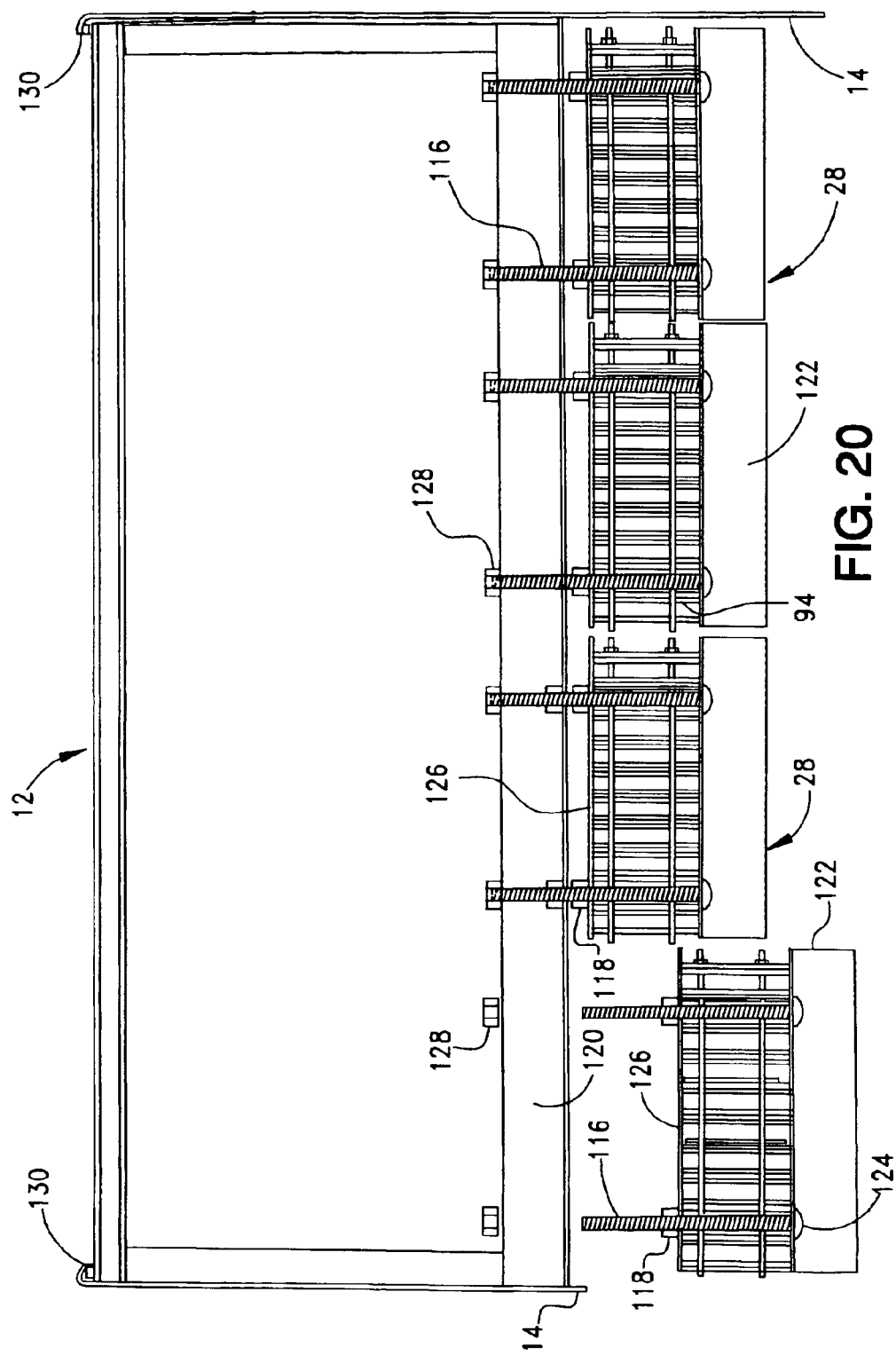
FIG. 20 is simplified vertical section of an upper part of the apparatus of FIG. 1 modified and showing the suspension of the upper ends of four grates, the left most one in partially exploded view.

FIG. 20 shows in greater detail the mounting of the upper ends of the grates 28 to the hood 12 at the top of each cell. Round headed suspension bolts 116, extending upwardly between adjacent pairs 94 of hanger bars, are locked in place by clamping nuts 118, and then pass upwardly through a cross beam 120 attached to the hood structure 12. Individual lengths of angle bars 122 are disposed under the upper pairs 94 of clamping bars between the round bolt heads 124 and the lower edges of the clamping bars. Individual lengths of flat stock 126 are disposed between the upper edges of the clamping bars and the clamping nuts 118. By adjusting uppermost tensioning nuts 128 of the suspension bolts 116, the elevation of the grates 28, and so the tension of the biomedia strips, can be adjusted. The leftmost grate is shown just before mounting to the hood. Another way of mounting the upper end of the curtain 14 on the hood is shown. The curtain 14 extends the full height of the hood 12, with the upper edge 130 of the curtain being hooked-shaped and hooked over the top of the hood. This hooked upper curtain edge 130 slidingly engages a rail running around the top of the hood.

It will be appreciated, that not only does the curtain arrangement of the present invention enable flexibility and economy in designing and building wastewater trickle towers, but the biomedia grate of the present invention adds further flexibility and economy. The new grates can readily be collapsed and packed in a shipping box for shipping and storage. When needed for service, they are simply lifted out of the box and their upper ends readily secured to the hoods; thereafter, the lower ends can readily be installed in the base tanks. Any needed separation of the biomedia strands can easily be accomplished through the openable accesses in the curtains. Thereafter, the lengths of biomedia strands can readily be correctly tensioned.

It will also be realized, that the sealing of the curtain at the top and bottom of the cells enables the air or other gas content in the cells to be more accurately controlled, thereby improving operating conditions.

The above described embodiments, of course, are not to be construed as limiting the breadth of the present invention. Modifications, and other alternative constructions, will be apparent which are within the spirit and scope of the invention as defined in the appended claims.

For example, instead of using one or more releasable fasteners, the edges of the curtain may be more permanently attached together during or after installation. This could be done by welding, sewing, stapling, etc. Although this would hamper subsequent access to the biomedia, it would still enable the advantages of flexibility of shape and cost saving to be obtained.

What is claimed is:

1. A wastewater treatment apparatus, comprising:
   a supporting structure;
   a plurality of strands of biomedia suspended from said supporting structure and extending downwardly;
   a wastewater discharge arrangement supported by said supporting structure above said biomedia for discharging wastewater onto said biomedia;

a receptacle below said biomedia for receiving wastewater falling from said biomedia;

a sleeve forming a wall surrounding said biomedia; and said sleeve comprising a flexible water impermeable curtain suspended from said structure and extending downwardly to said receptacle.

2. An apparatus as claimed in claim 1, wherein said curtain is sealed at an upper end to said structure and at a lower end to said receptacle.

3. An apparatus as claimed in claim 1, wherein said curtain has an upper end and a lower end with an opening located therebetween.

4. An apparatus as claimed in claim 1, wherein said strands of biomedia comprise strands of looped cord, and said curtain comprises plastic material.

5. An apparatus as claimed in claim 1, wherein said structure includes a hood extending over said wastewater discharge arrangement, and said curtain is attached to and around said hood.

6. An apparatus as claimed in claim 5, wherein said apparatus comprises a series of interconnected wastewater treatment cells, each cell having its own biomedia suspended from a separate hood over an associated receptacle.

7. An apparatus as claimed in claim 6, wherein each cell is individually surrounded by a separate flexible curtain.

8. An apparatus as claimed in claim 6, wherein at least two cells are jointly surrounded by the same flexible curtain.

9. An apparatus as claimed in claim 1, wherein said structure is part of a weatherproof building in which said treatment apparatus is housed.

10. An apparatus as claimed in claim 1, wherein said curtain comprises sheet plastic material.

11. An apparatus as claimed in claim 1, wherein said biomedia strands comprise lengths of looped cord biomedia under tension and extending space apart, vertically and parallel to each other.

12. An apparatus as claimed in claim 1, wherein said sleeve has a non-circular horizontal cross-section.

13. An apparatus as claimed in claim 12, wherein said wastewater discharge arrangement comprises a rotatable spray arm which in use defines a circular spray pattern, and a plurality of stationary spray nozzles providing sprays of wastewater outside of said circular spray pattern.

14. A wastewater trickle tower apparatus, comprising:

a support structure containing biomedia;

said support structure having a hood above the biomedia;

wastewater discharge means for discharging wastewater onto the biomedia;

a receptacle below the biomedia to receive wastewater falling from the biomedia; and a substantially water impermeable flexible curtain, an upper portion of which is attached to the hood.

15. A wastewater trickle tower apparatus, comprising:

a support structure containing biomedia;

wastewater discharge means for discharging wastewater onto the biomedia;

a receptacle below the biomedia to receive wastewater falling from the biomedia; and a flexible substantially water impermeable curtain that directs substantially all of said wastewater into said receptacle, said curtain associated with the support structure and extending downward to the receptacle.

16. The apparatus of claim 15, wherein said curtain extends downwardly inside the receptacle.

17. The apparatus of claim 15, wherein said support structure includes a hood over the wastewater discharge means and above the biomedia, and an upper portion of the curtain is attached to and sealed against an outside of the hood.

* * * * *